United States Patent [19]

Schlotterer

[11] Patent Number: 4,716,784
[45] Date of Patent: Jan. 5, 1988

[54] BICYCLE PEDAL FOR RELEASABLY CONNECTING THE SHOE OF THE CYCLIST THERETO

[76] Inventor: Joseph C. Schlotterer, 1016 Mallory Way, Carson City, Nev. 89701

[21] Appl. No.: 837,736

[22] Filed: Mar. 10, 1986

[51] Int. Cl.[4] ............................................. G05G 1/14
[52] U.S. Cl. .................................... 74/594.6; 36/131; 74/594.4
[58] Field of Search ................ 74/594.6, 594.4, 594.5, 74/594.1; 36/131; 280/11.3, 11.31

[56] References Cited

U.S. PATENT DOCUMENTS

| | | | |
|---|---|---|---|
| 3,964,343 | 6/1976 | Lauterbach | 74/594.6 |
| 4,089,236 | 5/1978 | Genzling | 74/594.4 |
| 4,377,952 | 3/1983 | Gamondes | 74/594.6 |
| 4,458,556 | 7/1984 | Schär | 74/594.6 |
| 4,538,480 | 9/1985 | Trindle | 74/594.6 |
| 4,596,163 | 6/1986 | Bon | 74/594.6 |
| 4,622,863 | 11/1986 | Denker | 74/594.6 |

FOREIGN PATENT DOCUMENTS

| | | | |
|---|---|---|---|
| 499621 | 2/1954 | Canada | 74/594.6 |
| 3000015 | 7/1980 | Fed. Rep. of Germany | 74/594.6 |
| 3315282 | 10/1984 | Fed. Rep. of Germany | 74/594.6 |
| 1030485 | 6/1953 | France | 74/594.6 |
| 2432427 | 2/1980 | France | 74/594.6 |

Primary Examiner—Gary L. Smith
Assistant Examiner—Vinh Luong
Attorney, Agent, or Firm—Thorpe, North & Western

[57] ABSTRACT

Quick connect and disconnect appartus for securing the foot of an operator to the pedal of a bicycle or like apparatus comprises interacting cooperative connector plates mounted on the pedal and the shoe of the operator respectively. The connector plates comprise interengaging, quadrilateral shaped members which interengage with each other along their mutually respective longer sides. The longer sides of the respective connector plates converge toward each other whereby firm engagement is achieved along the entire length of mutually opposite side edges of the respective connector plates, and the connector plates can further be quickly disconnected with a very short lateral movement which is less than one-half the length of the engageable side edges of the connector plates. Further, a novel pedal is adapted to self-orient itself into a position in which the connector plate on the pedal is always accessible to the matching connector plate on the shoe of the operator.

33 Claims, 9 Drawing Figures

BICYCLE PEDAL FOR RELEASABLY CONNECTING THE SHOE OF THE CYCLIST THERETO

BACKGROUND OF THE INVENTION

1. Field

The present invention pertains generally to a pedal for a bicycle or other foot-driven, crank-operated apparatus, and more particularly to such a pedal comprising coupling means in combination with conjugate means provided on the sole of a shoe for quickly and easily securing the shoe to the pedal for pedaling while also allowing rapid, safe disengagement of the shoe from the pedal during normal operation as well as in an emergency.

2. State of the Art

It has long been recognized that it is advantageous in bicycling and other similar pedaling applications to provide means for releasably engaging the shoe and foot of the operator to the pedal of the apparatus. Such attachment prevents the operator's foot from inadvertently slipping from the pedal as well as allowing the operator to exert a driving force on the pedal during both the downstroke as well as upstroke motion of the pedal and crank.

A variety of devices have been proposed in the prior art for providing releasable securement of the shoe of an operator to the pedal. The most rudimentary devices which have been used comprise a strap or toe cage attached to the pedal to extend over the toe and sometimes the instep of the shoe worn by an operator. Although such rudimentary devices can be used with generally any shoe worn by the operator, these devices have the disadvantages of being bulky, heavy and ackward to use. The latter disadvantage generally resulting because of the tendency for the weight of the strap or toe cage to rotate the pedal to an inoperating position in which the strap or toe cage faces downwardly. The operator must then reorientate the strap or toe cage to an operable position each time the operator engages the pedal.

Somewhat more sophisticated devices have been proposed for attaching a pedal gripping means to the bottom or sole of the shoe of the operator, with the gripping means being adapted for releasable connection to a corresponding or mating portion of the pedal. Examples of such connecting devices are disclosed in U.S. Pat. Nos. 458,608; 550,409; 595,388; 598,325; 3,788,163 and 4,488,453, in French Pat. Nos. 993,958; 967,277; 1,030,485; and 2,432,427, in British Pat. Nos. 16,829; 18,310 and 1,396,393 and in West German Pat. Nos. 3,000,015 and 3,149,345.

In all the devices of the above patents, the pedals have two major faces as is customary which can be used for the application of force. In most cases, however, only one face includes the mating portion for connection to the shoe of the operator. In these cases, as with the strap or toe cage as mentioned previously, the pedals are prone to rotate to a position in which the mating portion is not accessible, i.e. to a position in which it is facing downwardly from the operator. This problem has been alleviated in the past by utilizing balancing attachments of the type shown in U.S. Pat. No. 543,844. The balancing attachments unnecessarily increase the weight of the pedal and its complexity. In addition, the pedals of the prior art generally require an exaggerated motion of the shoe of the operator to engage and disengage the mating portions of the pedal and the operator's shoe. The mating portions generally must be aligned rather precisely, and the operator is apt to make several unsuccessful attempts to bring the mating portions into alignment before a successful move is made. The missed attempts are frustrating and can result in minor to more severe injury to the operator's foot as the shoe slips off or misses engagement with the pedal.

In U.S. Pat. No. 3,964,343, a pedal is disclosed which has a general prismatic configuration with at least three mutually congruent side faces. Each of the side faces are provided with mating means for mating with complementary means on the sole of the shoe of the operator. Theoretically, at least, the mating means can be secured substantially regardless of the position or attitude of any particular face of the pedal. In actual use, the mating means must be precisely aligned as with the other devices as discussed previously. The pedal generally rotates such that one of the side faces is oriented upwardly, but the mating means on the shoe of the operator must be aligned quite precisely with the complementary means on the side face of the pedal. Because of slight misalignments, the operator is likely to make several missed attempts which at best are frustrating and at worst can result in minor to more severe injury to the operator's foot as the shoe slips off or misses engagememt with the pedal.

OBJECTIVES

A principal objective of the present invention is to provide quick connect and disconnect means for securing the foot of an operator to the pedal of a bicycle or like apparatus which is foot-driven and crank-operated. A particular objective is to provide a novel means for engagement between cooperative connector plates mounted on the pedal and the shoe of the operator respectively, wherein firm, secure engagement between the connector plates occurs along the entire length of mutually opposite side edges of the respective connector plates, and further wherein the connector plates can be quickly disconnected from each other for safety purposes with a very short lateral movement which is less than one-half the length of the engageable side edges of the connector plates.

A further objective of the present invention is to provide quick connect and disconnect means comprising cooperating connector plates mounted on the pedal and the shoe of the operator, respectively, wherein the connector plate on the pedal is adapted to guide the corresponding connector plate on the shoe of the operator into mutual engagement with each other. A related objective is to provide such quick connect and disconnect means in which the connector plate mounted to the pedal is adapted to pivot about a substantially vertical axis, thereby providing a degree of flexibility in the relative movements between the connector plate on the pedal and the connector plate on the shoe of the operator to enhance proper alignment and engagement of the corresponding connector plates as well as to allow limited pivotal movement of the foot and shoe of the operator during the pedaling of the bicycle or like apparatus.

An additional objective of the present invention is to provide a novel pedal which is adapted to self-orient itself into a position in which the connector plate on the pedal is always accessible to the matching connector plate on the shoe of the operator.

SUMMARY OF THE INVENTION

The above objectives are achieved in accordance with the present invention by a novel pedal construction in which the pedal is attached to the crank of the bicycle or like apparatus by a spindle which has a relatively short axial length as compared to the length of the pedal as a whole. One end of the spindle is attached to the crank of the bicycle or like apparatus. A substantially L-shaped pedal body member is rotatably connected to the other end portion of the spindle i.e., the end portion which extends from the crank. The shorter leg of the L-shaped body member is rotatably mounted on the other end of the spindle as a journal bearing, with the spindle being the journal. The axis of the journal or spindle is substantially perpendicular to the longitudinal axis of the shorter leg of the L-shaped body member. The longer leg of the L-shaped body member extends outwardly away from the other end of the spindle and is offset along its entire length from the axis of the spindle. The longer leg is substantially parallel with the axis of the spindle, but as will be explained hereinafter, the longer leg may be slightly inclined at an angle no greater than about four degrees from with the axis of the spindle.

Whenever the spindle is in a substantially horizontal position, the longer leg of the L-shaped body member will gravitate to a position in which it is offset beneath the axis of the spindle.

Shoe connecting and disconnecting means are mounted on the upper side of the longer leg of the L-shaped body member, with the upper side being defined as the side of the longer leg which faces the axis of the spindle. Because of the gravitating movement of the longer leg of the L-shaped body, the upper side of the longer leg and the shoe connecting and disconnecting means mounted thereto will always face generally upwardly in a position which is accessible by the foot and shoe of the person who is operating the bicyle or like apparatus.

The shoe connecting and disconnecting means preferably comprises a shoe connector plate which is to be secured to the sole of a shoe worn by the operator of the bicyle or like apparatus, and a pedal connector plate which is mounted on the upper side of the L-shaped body member of the pedal. The shoe connector plate is mutually interengageable with the pedal connector plate for quickly and easily connecting and disconnecting the shoe of the operator and the pedal. Preferably, the pedal connector plate comprises a male or female interlocking means, and the shoe connector plate comprises a mutually corresponding interengageable male or female connector means which is adapted to engage and interlock the interlocking means of the pedal connector plate.

In one preferred aspect of the invention, the pedal connector plate and the shoe connector plate each have two longer opposite sides which converge toward an apex. Although the plates may be triangular in shape, the apex portion of the plates will generally be omitted such that the plates are essentially quadrilaterals in which the longitudinal end of each plate nearest the imaginary apex of the two converging sides thereof is, of course, smaller than the other end or base of the quadrilateral which is the end most remote from the imaginary apex of the two converging sides. As used throughout the specification and claims, the term "quadrilateral" shall be construed to include triangular shaped plates in which the apex portion has not been omitted. The two plates forming the shoe connecting and disconnecting means, i.e., the pedal connector plate and the shoe connector plate, are similar in shape to each other, with the angle of convergence of the longitudinal sides of the plates being essentially the same. The side edges of the converging sides of the pedal connector plate are bent upwardly to form interlocking means. The side edges of the converging sides of the shoe connector plate are bent downwardly to form connector means that are interengaeable with the upwardly bent interlocking means of the corresponding pedal connector plate.

The pedal connector plate is mounted on the L-shaped body member of the pedal such that either the smaller end or the opposite base end is adjacent to the smaller leg of the L-shaped member. The shoe connector plate is mounted on the shoe of the operator such that the shoe connector plate can be brought into engagement with the pedal plate connector by a lateral movement of the shoe connector plate toward the spindle and smaller leg of the L-shaped body member. The interlocking means on the convergent sides of the pedal connector plate slide into engagement along their full lengths with the connector means on the convergent sides of the shoe connector plate.

The convergent sides of the pedal connector advantageously form a guide for the shoe connector plate to aid in bringing the shoe connector plate into full engagement with the pedal connector plate. The pedal connector plate is further advantageously mounted to the L-shaped abody member for pivotal movement. This allows flexibility in the alignment of the pedal connector plate with the shoe connector plate as the connector plates are engaged with each other. In addition, the pivotal movement allows the foot and shoe of the operator to pivot slightly during operation of the bicycle or like apparatus. Because of the self-alignment and guiding characteristics of the connector plates, the operator can quickly and easily engage his foot to the pedal without requiring a high degree of dexterity or concentration. Even an untrained operator will find it easy to engage the connector plates. Engagement is easily made on the initial attempt and, thus, the problems with missed attempts at engaging the shoe with the pedal are almost entirely eliminated.

The connector plates make firm engagement along the entire length of their convergent sides to give a steady firm connection. Yet, the shoe plate is quickly released from the pedal with only a slight lateral movement. The quick release is effectrive to safely release the operator's foot from the pedal in case of an emergency of any type. The shoe connector plate need only move laterally with respect to the pedal connector plate a distance less than half the length of the plates to effect release between the convergent sides of the plates. The operator's foot is quickly and safely released from the pedal whenever release is desired including emergencies such as when the operator looses his balance and falls from the bicycle or like apparatus.

Additional objects and features of the present invention will become apparent from the following detailed description, taken together with the acccompanying drawings.

THE DRAWINGS

Preferred embodiments of the present invention representing the best modes presently contemplated of carrying out the invention are illustrated in the accompanying drawings, in which.

DETAILED DESCRIPTION OF THE PREFERRED EMBODIMENTS

Preferred embodiments of the novel pedal of the present invention are shown in the drawings and will be described hereinafter. Like parts in the various embodiments and views shown in the drawings will be identified with the same reference numbers.

The pedal of the present invention is capable of having the sole of a shoe of the operator quickly and efficiently connected thereto and disconnected therefrom. Self-guiding and alingment features of the pedal result in a particularly efficient and rapid connection. Unlike with previous pedals of the prior art in which the operator must concentrate closely on aligning the mating portions rather precisely, the pedal of the present invention does not require such preciseness of alignment, and even an unskilled operator can quickly effect engagement of his shoe to the pedal without the numerous unsuccessful attempts which are commonly encountered when using the pedals of the prior art. The missed attempts are frustrating to an operator and can result in minor to more severe injury to the operator's foot. The pedal of the present invention essentially eliminates such frustration and possible injury. In addition, the release means of the pedal of the present invention is also very efficient. A very small lateral movement of the operator's shoe will effect immediate release of the shoe from the pedal.

Figure 1:
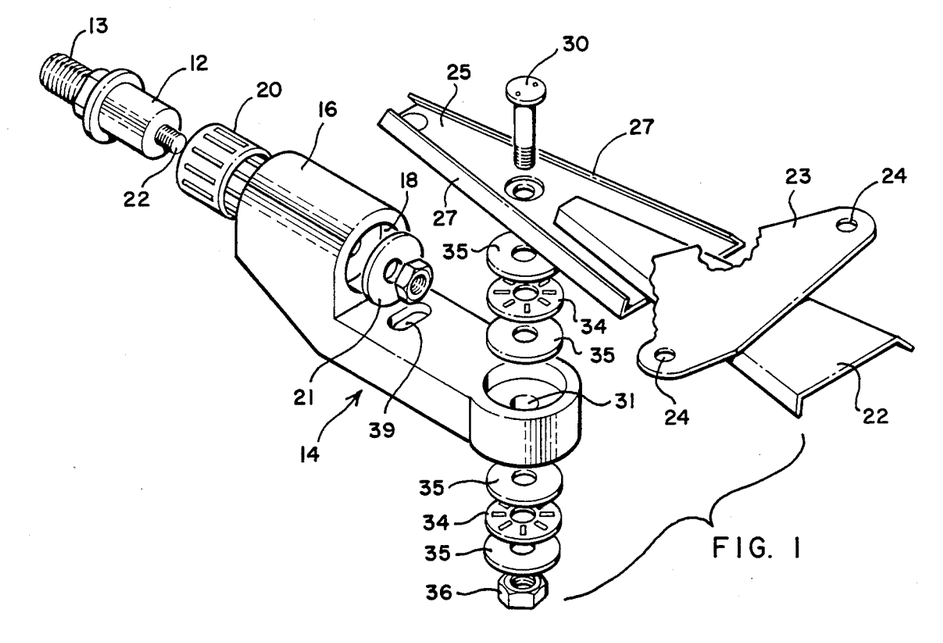
FIG. 1 is an exploded pictorial of a preferred embodiment of a bicycle pedal in accordance with this invention.
Figure 2:
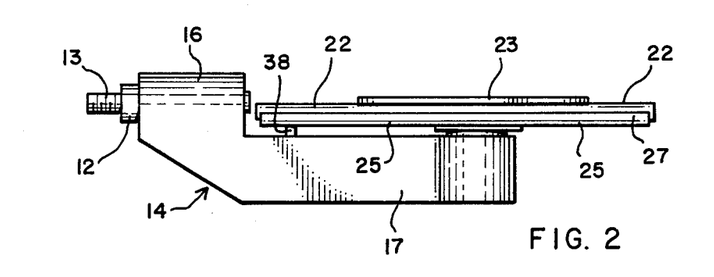
FIG. 2 is a side view of the pedal of FIG. 1.
Figure 3:
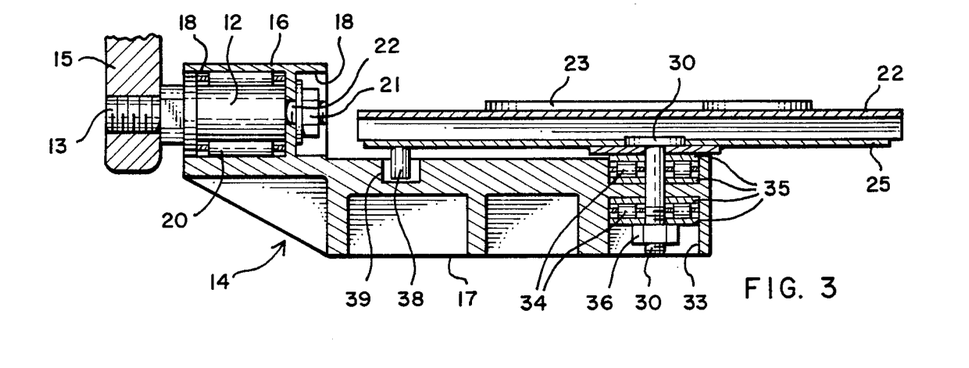
FIG. 3 is a horizontal cross sectional view taken along the longitudinal center line of the pedal of FIG. 1.
Figure 4:
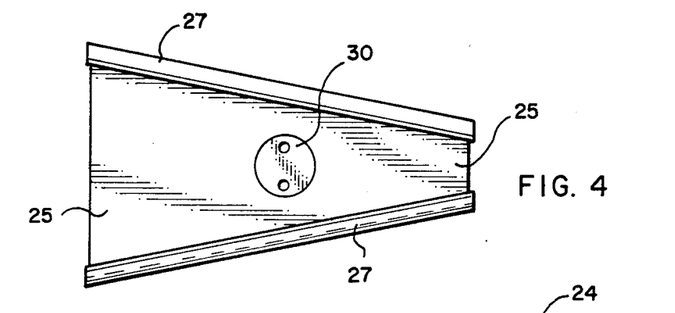
FIG. 4 is a top view of the pedal connector plate of the pedal of FIG. 1.

In a preferred embodiment of the invention as illustrated in FIGS. 1-3, the pedal comprises a spindle 12 which has a relatively short axial length as compared to the length of the pedal as a whole. Threads are provided at one end 13 of the spindle 12 for attaching spindle 12 and the pedal to a crank 15 of the bicycle or like apparatus on which the pedal is to be used. Such cranks are common and the crank 15 is illustrated only in FIG. 3 of the drawings. A substantially L-shaped pedal body member or treadle 14 is rotatably connected to the other end of the spindle 12. The L-shaped body member or treadle 14 comprises a shorter leg 16 and a longer leg 17. The shorter leg 16 is integrally attached at one end thereof to the first end of the longer leg 17. In the preferred embodiment as illustrated, the included angle between the shorter leg 16 and the longer leg 17 is between about 86 degrees and 90 degrees. The reason for the preferred range in the angle between the two legs will be discussed more fully hereinafter.

Means are provided for mounting the otherwise free end of the shorter leg 16 of the L-shaped threadle 14 on the other end of the spindle 12 for rotation of the treadle member 14 about the longitudinal axis of the spindle 12. In the preferred embodiment as illustrated, the shorter leg 16 is rotatably mounted as a journal bearing, with the spindle 12 being the journal. For this purpose, an open cavity 18 is provided in the shorter leg 16. The cavity 18 is preferrably cylindrical and extends through the shorter leg 16. Bearing means are housed in the cavity, with the bearing means being adapted to receive at least a portion of the spindle 12 which extends from the crank 15 so that the treadle 14 can rotate freely about the longitudinal axis of the spindle 12. As illustrated, the bearing means comprises a needle roller bearing 20 which is press fit into the cavity 18. At least a portion of the spindle 12 is machined to be received within the needle roller bearing 20. The treadle 14 and the bearing means are secured in their mounting about the spindle 12 by a bolt 21 which engages a treaded nipple 22 extending from the end of the spindle 12.

The longitudinal axis of the spindle 12 and the longitudinal axis of the shorter leg 16 of the treadle 14 cross each other so that the other end of the shorter leg 16, i.e., the end which is integrally attached to the longer leg 17, is offset or displaced from the longitudinal axis of the spindle 12. For simplicity in manufacturing the pedal apparatus, it is preferred to have the longitudinal axis of the spindle 12 and the longitudinal axis of the shorter leg 16 of the treadle 14 oriented substantially perpendicular to each other. What is important is that the longer leg 17 of the treadle lies lengthwise offset from and generally alongside the longitudinal axis of the spindle 12 and swings in axial rotational movement about the longitudinal axis of the spindle 12. The term axial rotational movement is meant to mean that the longitudinal axis of the longitudinal rotating member, i.e., the longer leg 17 of the treadle 14, lies at all times generally alongside the axis of the center of rotation, i.e., the longitudinal axis of the spindle 12. Although the longitudinal axis of the longer leg 17 will generally be substantially parallel to the longitudinal axis of the spindle 12, it is to be noted that the longitudinal axis of the longer leg 17 can be canted slightly with respect to the longitudinal axis of the spindle 12. In fact, in the preferred embodiment as illustrated, the longitudinal axis of the longer leg 17 is canted slightly towards the longitudinal axis of the spindle 12 in a direction away from the shorter leg 16 of the treadle 14. The small, acute angle between the longitudinal axis of the spindle 12 and longitudinal axis of the longer leg 17 generally will be no greater than about four degrees. The purpose of the offset of the longer leg 17 from the axis of the spindle 12 and the small canting of the longer leg 17 with respect to the axis of the spindle 12 will be explained more fully hereinafter.

Figures 5, 6, 7:
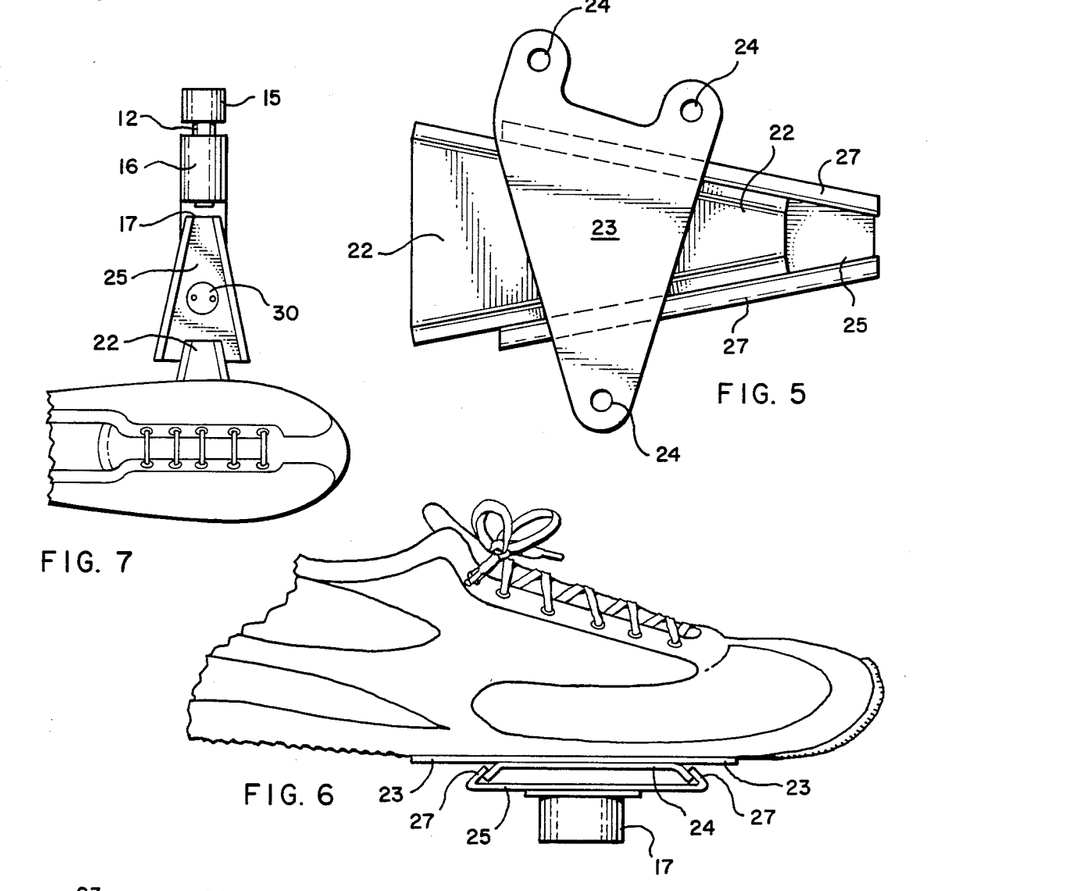
FIG. 5 is a top view of the shoe connector plate and pedal connector plate of the pedal of FIG. 1, with the shoe connector plate being in a position in which it is released from engagement with the pedal connector plate.
FIG. 6 a side view of a shoe having a shoe connector plate attached to the sole thereof and further wherein the shoe connector plate is in engagement with the pedal connector plate of the pedal of FIG. 1.
FIG. 7 is a top view of the shoe of FIG. 6 showing the shoe connector plate being guided into engagement with the pedal connector plate of the pedal.

To complete the pedal, novel shoe connecting and disconnecting means are mounted on the side of the longer leg 17 of the treadle 14 that faces the longitudinal axis of the spindle 12. A preferred embodiment of the novel shoe connecting and disconnecting means is shown in FIGS. 1–7 of the drawings. A shoe connector plate 22 is adapted to be secured to the sole of a shoe. For that purpose, a mounting plate 23 is advantageously attached to the connector plate 22, with openings 24 being provided in the mounting plate 23 to mount the connector plate 22 and mounting plate to the sole of a shoe substantially as shown in FIG. 6. A pedal connector plate 25 is mounted on the upper side of the longer leg 17 of the treadle 14. The upper side of the longer leg 17 is defined as the side thereof which faces the longitudinal axis of the spindle 12.

The shoe connector plate 22 is mutually interengageable with the pedal connector plate 25 for quickly and easily connecting and disconnecting the shoe of the operator and the pedal. As illustrated, the shoe connector plate 22 and pedal connector plate 25 are provided with cooperating male and female interlocking and connector means which are adapted to slide together into interengagement with each other.

In the preferred, illustrated embodiment, the pedal connector plate 25 has the shape of a quadrilateral which has two longer opposite sides that converge toward a common point or apex. The pedal connector plate 25 is mounted to the upper side of the longer leg 17 of the treadle 14 such that one of the longitudinal ends of the pedal connector plate 25 is positioned towards the inner part of the pedal adjacent to the end portion of the longer leg 17 which is affixed to the shorter leg 16. As illustrated, the shorter or smaller of the longitudinal ends of the pedal connector plate 25 is positioned toward the inner part of the pedal adjacent to the shorter leg 16 of the treadle 14. The pedal connector plate 25 extends substantially along the upper side of the longer leg 17 and away from the spindle 12 and shorter leg 16. The side edges 27 of the opposite longitudinal sides of the pedal connector plate 25 are bent upwardly to form either male or female interlocking means. As illustrated in FIGS. 1–7, the side edges 27 of the opposite longitudinal sides of the pedal connector plate 25 are bent upwardly and inwardly to form acute angles between the bent side edges 27 and the pedal connector plate 25. The side edges form a female interlocking means.

In the illustrated embodiment, the shoe connector plate 22 has the shape of a quadrilateral similar in size and shape to the size and shape of the pedal connector plate 25. The shoe connector plate 22 has two longer opposite sides which converge toward a common point or apex. The side edges 28 of the opposite longitudinal sides of the shoe connector plate 22 are bent downwardly to form either male or female connector means which are adapted to be interengageable with the corresponding interlocking means of the pedal connector plate 25. The pedal connector plate 25 comprises a male or female interlocking means, and the shoe connector plate 22 comprises a mutually corresponding male or female connector means. This then leads to the proviso that if the pedal connector plate 25 has its side edges 27 of its opposite longitudinal sides bent so as to form a female interlocking means, the shoe connector plate has its side edges 28 of its opposite longitudinal sides bent so as to form a male connector means, and if the pedal connector plate 25 has its side edges 27 bent so as to form a male interlocking means, the shoe connector plate 22 has its side edges 28 bent so as to form a female connector means.

As illustrated, the side edges 27 of the pedal connector of the pedal connector are bent so as to form female interlocking means. Accordingly, the side edges 28 of the shoe connector plate 22 are bent to form male connector means in which the side edges 28 are bent downwardly and outwardly to form obtuse angles between the bent sides 28 and the shoe connector plate 22. As best shown in FIGS. 1 and 5, the downwardly bent side edges 28 of the shoe connector plate 22 form male connector means which readily interengage the corresponding female upwardly and inwardly bend side edges 27 of the pedal connector plate 25. The engagement is effected by lateral movement of the shoe connector plate 22 into interengagement with the pedal connector plate 25.

The interlocking means on the pedal connector plate 25 guide the corresponding connector means of the shoe plate 22 into interengagement. The narrow end of the shoe connector plate 22 is placed on the flat portion of the pedal connector plate 25 adjacent to the wider end thereof, and the bent side edges 27 of the pedal connector plate 25 guide the corresponding side edges 28 of the shoe connector plate into engagement with each other. Effective engagement is made along the full longitudinal lengths of the corresponding side edges 27 and 28. This allows pedaling force to be applied evenly over the full width of the pedal and supplies stability to the connection between the operator's foot and the pedal. As shown in FIG. 7, the shoe connector plate 22 preferably extends slightly from the inside edge of the user's shoe, such that the tip of the shoe connector plate is visible to the user. The visible tip of the shoe connector plate 22 makes it much eaiser for the user to guide the shoe connector plate 22 into engagement with the pedal connector plate 25.

It is desirable to have a quick safety release that can be effected very quickly and spontaneously. This is especially useful in an emergency, such as when the operator losses his balance and falls from the bicycle or like apparatus. A quick release of the operator's foot and shoe greatly decreases the chance of injury to the operator's foot, ankle and leg. The safety release of the present pedal is extremely efficient and is effected spontaneously and quickly. Release is achieved by a relatively short lateral movement of the shoe connector plate 22 away from the pedal connector plate 25. The relative position to achieve release is shown in FIG. 5. As can be seen, the lateral movement necessary to effect release is much shorter than the longitudinal length of either the pedal connector plate 25 or the shoe connector plate 22. In an emergency, the operator's natural reaction is to move his feet away from the pedal. Safety release from the pedal is achieved automatically and almost instantaneously with the novel interlocking and connector means of the present invention.

The quick release is dependent upon the included angle between the converging opposite longitudinal sides of the pedal connector plate 25 and shoe connector plate 22. As the angle is increased, the length of the lateral movement necessary to effect release is shortened. However, the device becomes large and somewhat awkward when the included angles become too large. Advantageously, the included angle formed by the converging opposite longitudinal sides of the pedal connector plate 25 is between about 15 degrees and 45 degrees. Preferably, the included angle is between about 15 degrees and 25 degrees. Of course, the included angle formed by the converging opposite longitudinal sides of the shoe connector plate 22 is the same as the corresponding included angle of the pedal connector plate 25.

The purpose of relatively short spindle 12 and the longer leg 17 of the treadle 14 being offset so as to lie alongside the axis of the spindle 12 can now readily be understood. The offset nature of the longer leg 17 of the treadle 14 and its essential cantilever attachment to the spindle 12 through the shorter leg 16 of the treadle 14 results in the center of gravity of the treadle member 14 being shifted so as to be offset from the axis of the treadle in the direction of the offset of the longer leg 17. The longer leg 17 thus at all times gravitates to a position in which it is below the axis of the spindle 12. The upper side of the longer leg 17 of the treadle 14 is accordingly always facing upwardly, and the pedal connector plate 25 which is attached to the upwardly facing side of the longer leg 17 is maintained in a proper position or attitude to be accessible for engagement with the shoe connector plate 22 on the shoe of an operator. The short spindle 12 and the cantilevering of the longer leg 17 of the treadle 14 away from the spindle 12 provide access for the pedal connector plate 25 and the shoe and shoe connector plate 22.

In a particularly preferred aspect or embodiment of the invention, the pedal connector plate 25 is pivotally mounted to the free end portion of the longer leg 17 of the treadle 14 to allow the pedal connector plate 25 to pivot about an axis through the longitudinal center line of the pedal connector plate 25, with the pivot axis of the pedal connector plate 25 further lying in a plane passing through the longitudinal center line of the longer leg 17 and the axis of the spindle 14. The pivotal movement of the pedal connector plate enhances the alignment and the guiding of the shoe connector plate 22 into interlocking engagement with the pedal connector plate 25. In addition, the pivotal movement of the pedal connector plate 25 allows the foot and shoe of the operator to pivot slightly during normal pedaling.

As illustrated in FIGS. 1 and 3, the pivoting means for the pedal connector plate 25 may compose a threaded bolt 30 which is attached at its upper end to the pedal connector plate 25. The head of the bolt 30 is counter sunk within the plate 25 so that the head of the bolt 30 is substantially level with the upper surface of the plate 25. The longer leg 17 of the treadle 14 has an opening 31 which is adapted to receive the bolt 30. Countersunk bores 32 and 33 are provided at the upper side and lower side respectively of the leg 17. A disc needle bearing 34 and a pair of bearing washers 35 are provided for each of the countersunk bores 32 and 33, with the bearings being held in the countersunk bores 32 and 33 by the bolt 30 and a nut 36.

Means are preferably provided for limiting the pivotal movement of the pedal connector plate 25 such that the longitudinal center line of the pedal connector plate 25 can pivot between about eight degrees to eleven degrees on either side of the plane passing through the longitudinal center line of the longer leg 17 of the treadle 14 and the axis of the spindle 12. The means for restraining the pivotal movement of the pedal connector plate 17 as illustrated comprises a pin 38 projecting from the lower side of the pedal connector plate 25. The pin 38 engages a slot 39 in the upper side of the longer leg 17 of the treadle 14 for movement of the pin 38 back and forth in the slot 39.

It has been found advantageous to have the pedal connector plate 25 slope slightly downwardly in a direction from its free end toward the shorter leg 16 of the treadle 14. The slope is between about one degree and four degrees with respect to the axis of the spindle 12 or a horizontal reference plane which is parallel with the axis of the spindle 12 during normal pedaling operation of the bicycle or like apparatus on which the pedal is mounted.

There are several means that can be employed to achieve the slope in the pedal connector plate 25. One of the means involves the angle between the longitudinal axis of the shorter leg 16 and the longitudinal axis of the longer leg 17 of the treadle 14. As mentioned previously, this angle can be between about 86 degrees and 90 degrees. The angle between the axis of the spindle 12 and the longitudinal axis of the shorter leg 16 of the treadle 14 is essentially a right angle. Thus, when the angle between the axis of the shorter leg 16 and longer leg 17 is 84 degrees, the slope of the pedal connector plate 25 will be four degrees. If the angle between the axis of the shorter leg 16 and longer leg 17 is 90 degrees, the slope of the pedal connector plate 25 must be achieved by another means which will now be described.

To simplify construction of the pedal, the axis of the connection between the pedal connector plate 25 and the longer leg 17 of the treadle is essentially at right angle to the pedal connector plate 25. When the pedal connector plate 25 is pivotally mounted to the treadle 14, the pivot axis is substantially perpendicular to the longitudinal center line of the pedal connector plate 25. To achieve the desired slope of the pedal connector plate 25, the axis of the pedal connector plate 25 is inclined so that the included angle between the pivot axis and the longitudinal axis of the longer leg 17 of the treadle 14 is between about 86 degrees and 89 degrees. Inasmuch as the axis of the spindle 12 is parallel to the longitudinal axis of the longer leg 17 of the treadle 14, the pivot axis of the pedal connector plate 25 will also be inclined at an angle of 86 degrees to 89 degrees with the axis of the spindle 14.

The slight slope of the pedal connector plate 25 is advantageous in enhancing the positive engagement between the pedal connector plate 25 and the shoe connector plate 22 even when the operator is placing maximum downward pressure on the treadle 14. The slight slope tends to force the pedal connector plate 25 and the shoe connector plate into engagement under the force applied to the treadle 14.

Figure 8:
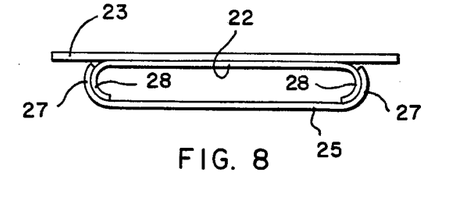
FIG. 8 is a side view of alternate embodiments of the shoe connector plate and pedal connector plate of the invention.
Figure 9:
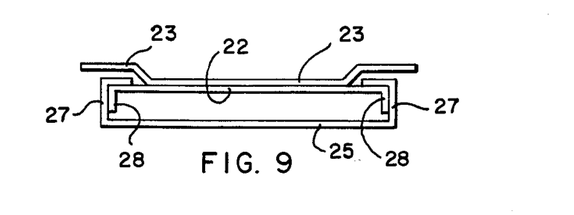
FIG. 9 is a view similar to that of FIG. 8 showing further alternate embodiments of the shoe connector plate and pedal connector plate of the invention.

Two modified embodiments of the male and female type side edges which can be used on the pedal connector plate 25 and the shoe connector plate 22 are illustrated in FIGS. 8 and 9. In FIG. 8, the side edges 27 of the opposite longitudinal sides of the pedal connector plate 25 are bent upwardly and curve inwardly to form concave inwardly facing edges. The corresponding side edges 28 of the opposite longitudinal sides of the shoe connector plate 22 are bent downwardly and curve inwardly to form concave inwardly facing edges which mate and engage the edges 27 of the pedal connector plate 25. In FIG. 9, the side edges 27 of the opposite longitudinal sides of the pedal connector plate 25 are bent upwardly and then inwardly to form a flange along the upper edges thereof. The side edges 28 of the opposite longitudinal sides of the shoe connector plate 22 are bent downwardly to mate and engage the edges 27 of the pedal connector plate 25.

It is to be understood that the present disclosure, including the detailed description of several preferred embodiments, is made by way of example and that various other embodiments are possible without departing from the subject matter coming within the scope of the following claims, which subject matter is regarded as the invention.

I claim:

1. A pedal for a crank of a crank driven apparatus, wherein the pedal is capable of having a sole of a shoe of an operator of the apparatus readily connected thereto and disconnected therefrom, said pedal comprising:

a spindle having first and second ends, with an axial length relatively short as compared to a respective axial length of the pedal;

connecting means at the first end of the spindle for connecting said spindle to the crank of the crank driven apparatus;

a substantially L-shaped treadle member comprising a shorter leg and a longer leg, wherein the shorter leg has first and second ends, with the first end being integrally attached to a first end of the longer leg;

means for rotatively mounting the second end of the shorter leg of said treadle member to the second end of said spindle for rotation of said treadle member about a longitudinal axis of said spindle so that the longer leg of said treadle member lies lengthwise offset from and generally alongside the longitudinal axis of said spindle and swings in axial rotational movement about the longitudinal axis of said spindle; and shoe connecting and disconnecting means mounted on a side of the longer leg of said treadle member that faces the longitudinal axis of said spindle, said shoe connecting and disconnecting means comprising;

pedal connector plate having a shape of a quadrilateral having two continuous opposite ends and two continuous longer opposite sides which interconnect between the opposite ends and converge toward each other, said pedal connector plate being mounted to an upper side of the longer leg of said treadle member such that one of the opposite ends of the pedal connector plate is positioned adjacent to an end portion of said longer leg which is affixed to the shorter leg, whereby the pedal connector plate extends substantially along the upper side of the longer leg and away from the spindle and shorter leg;

interlocking means formed along respective entire lengths of said two longer sides of said pedal connector plate;

a shoe connector plate having a shape of a quadrilateral having two continuous opposite ends and two continuous longer opposite sides which interconnect between the opposite ends and converge toward each other, said shoe connector plate being adapted to be secured to the sole of a shoe;

connector means formed along respective entire lengths of said two longer sides of said shoe connector plate;

wherein the connector means on the shoe connector plate is mutually interengageable and interlockable with the interlocking means on the pedal connector plate such that firm engagement is achieved along the entire length of the opposite sides of the mutually respective shoe connector plate and the pedal connector plate.

2. A pedal in accordance with claim 1, wherein the connecting means at said first end of the spindle comprises external threads on said first end of the spindle which are adapted to be engaged in an internally threaded receptacle in the crank of the apparatus.

3. A pedal in accordance with claim 1, wherein the means for rotatively mounting the shorter leg of said treadle member to said spindle comprises an open cavity in said shorter leg and bearing means housed in said cavity, with the bearing means being adapted to receive at least a portion of the spindle which extends from the crank of the apparatus so that the treadle member can rotate freely about the longitudinal axis of said spindle.

4. A pedal in accordance with claim 3, wherein the cavity is generally cylindrical, the bearing means comprises a needle roller bearing which is press fit into said cavity, and at least a portion of the spindle is machined to be received within the needle roller bearing.

5. A pedal in accordance with claim 1, wherein the shorter and longer legs of said treadle member are oriented with respect to each other at an angle of between about 86 degrees and 90 degrees, and further wherein the longitudinal axis of said spindle and the longitudinal axis of said shorter leg of said treadle member are substantially perpendicular to each other.

6. A pedal in accordance with claim 1, wherein side edges of the opposite longer sides of said pedal connector plate are bent upwardly to form the interlocking means thereon, and side edges of the opposite longer sides of said shoe connector plate are bent downwardly to form the connector means thereon.

7. A pedal in accordance with claim 6, wherein the pedal connector has side edges of its opposite longer sides bent so as to form a female interlocking means, and the shoe connector plate has side edges of its opposite longer sides bent so as to form a mutually corresponding interengagable male connector means.

8. A pedal in accordance with claim 6, wherein the pedal connector plate has side edges of its opposite longer sides bent so as to form a male interlocking means, and the shoe connector plate has side edges of its opposite longer sides bent so as to form a female connector means.

9. A pedal in accordance with claim 6, wherein the side edges of the opposite longer sides of the pedal connector plate are bent upwardly and inwardly to form acute angles between the bent side edges and the pedal connector plate, and the side edges of the opposite longer sides of the shoe connector plate are bent downwardly and outwardly to form obtuse angles between the bent side edges and the shoe connector plate.

10. A pedal in accordance with claim 6, wherein the side edges of the opposite longer sides of the pedal connector plate are bent upwardly and curve inwardly to form concave inwardly facing edges, and the side edges of the opposite longer sides of the shoe connector plate are bent downwardly and curve inwardly to form concave inwardly facing edges.

11. A pedal in accordance with claim 6, wherein the side edges of the opposite longer sides of the pedal connector plate are bent upwardly and then inwardly to form a flange along upper edges thereof, and the side edges of the opposite longer sides of the shoe connector plate are bent downwardly.

12. A pedal in accordance with claim 1, wherein the converging opposite longer sides of the pedal connector plate have an included angle which is between about 15 degrees and 45 degrees, and the converging opposite longer sides of the shoe connector plate having an included angle which is the same as the included angle formed by the converging opposite longer sides of the pedal connector plate.

13. A pedal in accordance with claim 12, wherein the included angle is between about 15 degrees and 25 degrees.

14. A pedal in accordance with claim 12, wherein a shorter of the ends of the pedal connector plate is positioned adjacent to an end portion of said longer leg which is affixed to the shorter leg of said treadle member.

15. A pedal in accordance with claim 14, wherein the pedal connector plate is pivotally mounted to a free end portion of the longer leg of said treadle member such that the pedal connector plate can pivot about a pivot axis through a longitudinal center line of said pedal connector plate, and further wherein the pivot axis of the pedal connector plate lies in a plane passing through a longitudinal center line of the longer leg of said treadle member and the longitudinal axis of the spindle.

16. A pedal in accordance with claim 15, wherein the pivot axis of the pedal connector plate is substantially perpendicular to the longitudinal center line of the pedal connector plate, with the pivot axis of the pedal connector plate further being inclined so that an included angle between the pivot axis of the pedal connector plate and the longitudinal axis of the spindle is between about 86 degrees and 89 degrees.

17. A pedal in accordance with claim 15, wherein means are provided for restraining the pivotal movement of the pedal connector plate such that the longitudinal center line of the pedal connector plate can pivot between about eight degrees to eleven degrees on either side of a plane passing through the longitudinal center line of the longer leg of said treadle member and the longitudinal axis of the spindle.

18. A pedal in accordance with claim 17, wherein the pedal connector plate slopes downwardly from an end thereof most remote from the shorter leg of said treadle member toward an end thereof closest to said shorter leg, with the slope being between about one degree and four degrees with respect to a horizontal reference plane.

19. A pedal in accordance with claim 17, wherein the means for restraining the pivotal movement of the pedal connector plate comprises
  a pin projecting from a lower side of the pedal connector plate, and
  a slot in an upper side of the longer leg of said treadle member which receives the pin on the pedal connector plate for movement of said pin back and forth in said slot.

20. A pedal for a crank of a crank driven apparatus, wherein the pedal is capable of having a sole of a shoe of an operator of the apparatus readily connected thereto and disconnected therefrom, said pedal comprising:
  a treadle member which is adapted to be rotatively connected at one of its longitudinal ends to the crank;
  a pedal connector plate mounted on said treadle member, said pedal connector plate having a shape of a quadrilateral having two continuous opposite ends and two continuous longer opposite sides which interconnect between the opposite ends and converge toward each other, said pedal connector plate being mounted to said treadle member such that one of the opposite ends of the pedal connector plate is positioned adjacent to an end portion of said treadle member which is connected to the crank, whereby the pedal connector plate extends substantially along said treadle member and away from the crank, with side edges of said two opposite longer sides of said pedal connector plate being bent upwardly to form interlocking means extending along respective entire lengths of said two longer sides of said pedal connector plate, and
  a shoe connector plate adapted to be secured to the sole of the shoe, said shoe connector plate having a shape of a quadrilateral having two continuous opposite ends and two continuous longer opposite sides which interconnect between said two opposite ends and converge toward each other, with side edges of respective entire lengths of said two opposite longer sides of said shoe connector plate being bent downwardly to form connector means for interengaging along the entire length of the respective longer sides of said shoe connector plate with the interlocking means along the entire length of the longer sides of said pedal connector plate for quickly and easily connecting and disconnecting the shoe of the operator and the pedal.

21. A pedal in accordance with claim 20 wherein the pedal connector plate has the side edges of its opposite longer sides bent so as to form a female interlocking means, and the shoe connector plate has the side edges of its opposite longer sides bent so as to form a male connector means.

22. A pedal in accordance with claim 20, wherein the pedal connector plate has the side edges of its opposite longer sides bent so as to form a male interlocking means, and the shoe connector plate has the side edges of its opposite longer sides bent so as to form a female connector means.

23. A pedal in accordance with claim 20, wherein the converging opposite longer sides of the pedal connector plate have an included angle of between about 15 degrees and 45 degrees, and the converging opposite longer sides of the shoe connector plate have an included angle which is the same as the included angle formed by the converging opposite longer sides of the pedal connector plate.

24. A pedal in accordance with claim 23, wherein the included angle is between about 15 degrees and 25 degrees.

25. A pedal in accordance with claim 23, wherein a shorter of the ends of the pedal connector plate is positioned adjacent to an end portion of the treadle member which is connected to the crank.

26. A pedal in accordance with claim 25, wherein the pedal connector plate is pivotally mounted to the treadle member such that the pedal connector plate can pivot about a pivot axis through a longitudinal center line of said pedal connector plate, and further wherein the pivot axis of the pedal connector plate lies in a plane passing through a longitudinal center line of the treadle member and the longitudinal axis of the spindle.

27. A pedal in accordance with claim 26, wherein the pivot axis of the pedal connector plate is substantially perpendicular to the longitudinal center line of the pedal connector plate, with the pivot axis of the pedal connector plate further being inclined so that an included angle between the pivot axis of the pedal connector plate and the longitudinal center line of the treadle member is between about 86 degrees and 89 degrees.

28. A pedal in accordance with claim 26, wherein means are provided for restraining the pivotal movement of the pedal connector plate such that the longitudinal center line of the pedal connector plate can pivot between about eight degrees to eleven degrees on either side of a longitudinal center line of the treadle member.

29. A pedal in accordance with claim 28, wherein the pedal connector plate slopes downwardly from an end thereof most remote from the crank toward an end thereof which is connected to the crank, with the slope being between about one degree and four degrees with respect to a horizontal reference plane.

30. A pedal in accordance with claim 28, wherein the means for restraining the pivotal movement of the pedal connector plate comprises
   a pin projecting from a lower side of the pedal connector plate, and
   a slot in an upper side of the treadle member which receives the pin on the pedal connector plate for movement of said pin back and forth in said slot.

31. A pedal in accordance with claim 20, wherein the side edges of the opposite longer sides of the pedal connector plate are bent upwardly and inwardly to form acute angles between the bent side edges and the pedal connector plate, and the side edges of the opposite longer sides of the shoe connector plate are bent downwardly and outwardly to form obtuse angles between the bent side edges and the shoe connector plate.

32. A pedal in accordance with claim 20 wherein the side edges of the opposite longer sides of the pedal connector plate are bent upwardly and curve inwardly to form concave inwardly facing edges, and the side edges of the opposite longer sides of the shoe connector plate are bent downwardly and curve inwardly to form concave inwardly facing edges.

33. A pedal in accordance with claim 20 wherein the side edges of the opposite longer sides of the pedal connector plate are bent upwardly and then inwardly to form a flange along upper edges thereof, and the side edges of the opposite longer sides of the shoe connector plate are bent downwardly.

* * * * *